United States Patent [19]

Yoneyama

[11] Patent Number: 5,487,176
[45] Date of Patent: Jan. 23, 1996

[54] RECEPTION AMPLIFIER FAILURE DETECTION DEVICE AND METHOD FOR RADIO TRANSCEIVER APPARATUS

[75] Inventor: Yuzo Yoneyama, Tokyo, Japan

[73] Assignee: NEC Corporation, Tokyo, Japan

[21] Appl. No.: 271,740

[22] Filed: Jul. 7, 1994

[30] Foreign Application Priority Data

Jul. 7, 1993 [JP] Japan ............................... 5-167569

[51] Int. Cl.⁶ .................................. H04B 17/00
[52] U.S. Cl. .................. 455/67.1; 455/67.7; 455/126; 455/226.2; 455/293; 455/226.4
[58] Field of Search ..................................... 455/3.2, 67.1, 455/67.7, 69, 126, 127, 226.1–226.4, 289, 293, 78, 341

[56] References Cited

U.S. PATENT DOCUMENTS

| | | | |
|---|---|---|---|
| 4,864,639 | 9/1989 | Dapore et al. | 455/226.4 |
| 5,313,657 | 5/1994 | Sakamoto et al. | 455/226.1 |

OTHER PUBLICATIONS

"Mobile Radio Communication Scheme", *Kagakushimbun-sha*, p. 202 (May 1979).

*Primary Examiner*—Chi H. Pham
*Attorney, Agent, or Firm*—Foley & Lardner

[57] ABSTRACT

A reception amplifier failure detecting device includes an antenna sharing unit, a reception amplifier, a receiver, an electric field detecting section, a transmitter, a power control section, and a failure detecting section. The antenna sharing unit demultiplexes a transmission signal from a transmission system to an antenna and a reception signal from the antenna to a reception system. The reception amplifier amplifies the reception signal. The receiver receives an output signal from the reception amplifier. The electric field detecting section detects the electric field strength of a signal received by the receiver. The transmitter outputs a transmission signal to the antenna via the antenna sharing unit. The power control section controls the transmission power of the transmitter on the basis of a standard transmission value, and outputs transmission power information. The failure detecting section performs failure determination by comparing the electric field strength information with a failure detection reference value set on the basis of a standard attenuation value, a standard amplification value of the reception amplification means, and the transmission power information of the transmission means. A reception amplifier failure detecting method is also disclosed.

9 Claims, 3 Drawing Sheets

RECEPTION AMPLIFIER FAILURE DETECTION DEVICE AND METHOD FOR RADIO TRANSCEIVER APPARATUS

BACKGROUND OF THE INVENTION

The present invention relates to a failure detecting device ant method for a radio transceiver apparatus and, more particularly, to a failure detecting device and method for detecting a failure in an outdoor reception amplifier unit of the radio transceiver apparatus.

As shown in FIG. 3, a conventional failure detecting device of this type is designed such that an indoor transceiver unit 20 always monitors whether an outdoor reception amplifier unit 10, arranged outdoors together with an antenna 30, is operating normally.

The outdoor reception amplifier unit 10 includes an antenna sharing unit 11, a pilot signal generator 13, a hybrid circuit 12, and a reception amplifier 14. The antenna sharing unit 11 demultiplexes a transmission signal S8 transmitted from a transmitter 21 of the indoor transceiver unit 20 to the antenna 30, and also demultiplexes a reception signal S1 received by the antenna 30 to the hybrid circuit 12. The pilot signal generator 13 generates a pilot signal S2 used to determine whether a failure is detected. The hybrid circuit 12 combines the reception signal S1, demultiplexed by the antenna sharing unit 11, and the pilot signal S2. The reception amplifier 14 amplifies a signal S3 obtained by the hybrid circuit 12, and transmits the amplified signal, as a signal S4, to a receiver 22 of the indoor transceiver unit 20 and another receiver (not shown).

The indoor transceiver unit 20 includes the receiver 22, an electric field detecting section 23, and a failure detecting section 24. The receiver 22 transmits reception signal information S5 to the electric field detecting section 23 upon tuning the reception signal information S5 to the frequency of the signal S3 contained in the signal S4 and transmitted from the pilot signal generator 13. The electric field detecting section 23 detects the electric field strength of the pilot signal S2 tuned/received by the receiver 22, and outputs electric field strength information S6. The failure detecting section 24 compares predetermined reception electric field strength information of a pilot signal with the actual electric field strength information S6 of the pilot signal received by the electric field detecting section 23 to check whether the reception amplifier 14 of the indoor transceiver unit 20 is operating normally. If it is determined that the reception amplifier 14 is operating abnormally, the failure detecting section 24 outputs failure information S7.

A failure detecting operation of the device having the above arrangement will be described next.

The pilot signal S2 generated by the pilot signal generator 13 is used as a target value to be always monitored to check whether the reception amplifier 14 of the outdoor reception amplifier unit 10 is operating normally. The pilot signal S2 is combined with the reception signal S1 by the hybrid circuit 12, and the combined signal S3 is amplified by the reception amplifier 14 and supplied to the indoor transceiver unit 20. The reception signal S1 used for normal communication is received after being tuned to a reception signal frequency by a receiver (not shown) of the indoor transceiver unit 20. The receiver 22 receives the pilot signal S2 tuned to a pilot signal frequency and contained in the signal S4. The electric field strength of the pilot signal S2 received by the receiver 22 is detected by the electric field detecting section 23, and the electric field strength information S6 is supplied to the failure detecting section 24. A pilot signal electric field strength detection level is set in the failure detecting section 24 in advance in accordance with the output level of the pilot signal generator 13 for generating the pilot signal S2 and the amplification factor of the reception amplifier 14. The failure detecting section 24 compares this detection level with the electric field strength information S6 actually supplied from the electric field detecting section 23. If there is a difference of a predetermined value or more, the failure detecting section 24 determines that a failure has occurred in the reception amplifier 14, and outputs the failure information S7.

In this conventional failure detecting device, the pilot signal generator 13 for generating a pilot signal as a means for detecting a failure must be arranged in addition to the pilot signal generator required for the transceiver apparatus, resulting in an increase in the cost of the unit.

Since the standard value of the output level of the pilot signal generator 13 is used, when the output level varies due to a failure in the pilot signal generator 13, failure information is output, even though the reception amplifier 14 is operating normally. For this reason, periodic maintenance is required to ensure the normal operation of the pilot signal generator 13. In addition, since the outdoor reception amplifier unit 10 is fixed to a high installation place such as a steel tower owing to its function, the cost for periodic maintenance of the pilot signal generator 13 is high.

SUMMARY OF THE INVENTION

It is an object of the present invention to provide a reception amplifier failure detecting device for a radio transceiver apparatus, which requires no pilot signal and can be manufactured at low cost, and a method therefor.

It is another object of the present invention to provide a reception amplifier failure detecting device for a radio transceiver apparatus, which does not require periodic maintenance, and a method therefor.

In order to achieve the above objects, according to the present invention, there is provided a reception amplifier failure detecting device for a radio transceiver apparatus, comprising demultiplexing means for demultiplexing a transmission signal from a transmission system to an antenna, and also demultiplexing a reception signal from the antenna to a reception system, reception amplification means, connected to an input stage of the reception system, for amplifying the reception signal demultiplexed by the demultiplexing means, reception means for receiving an output signal from the reception amplification means, electric field detecting means for detecting an electric field strength of a signal received by the reception means, transmission means, constituting the transmission system, for outputting a transmission signal to the antenna via the demultiplexing means, power control means for controlling transmission power of the transmission means on the basis of a standard transmission value, and outputting transmission power information, and failure detecting means for performing failure determination by comparing electric field strength information from the electric field detecting means with a failure detection reference value set on the basis of a standard attenuation value set when a transmission signal from the transmission means leaks to the reception system in the demultiplexing means, a standard amplification value of the reception amplification means, and the transmission power information of the transmission means.

DESCRIPTION OF THE PREFERRED EMBODIMENT

The present invention will be described below with reference to the accompanying drawings.

Figure 1:
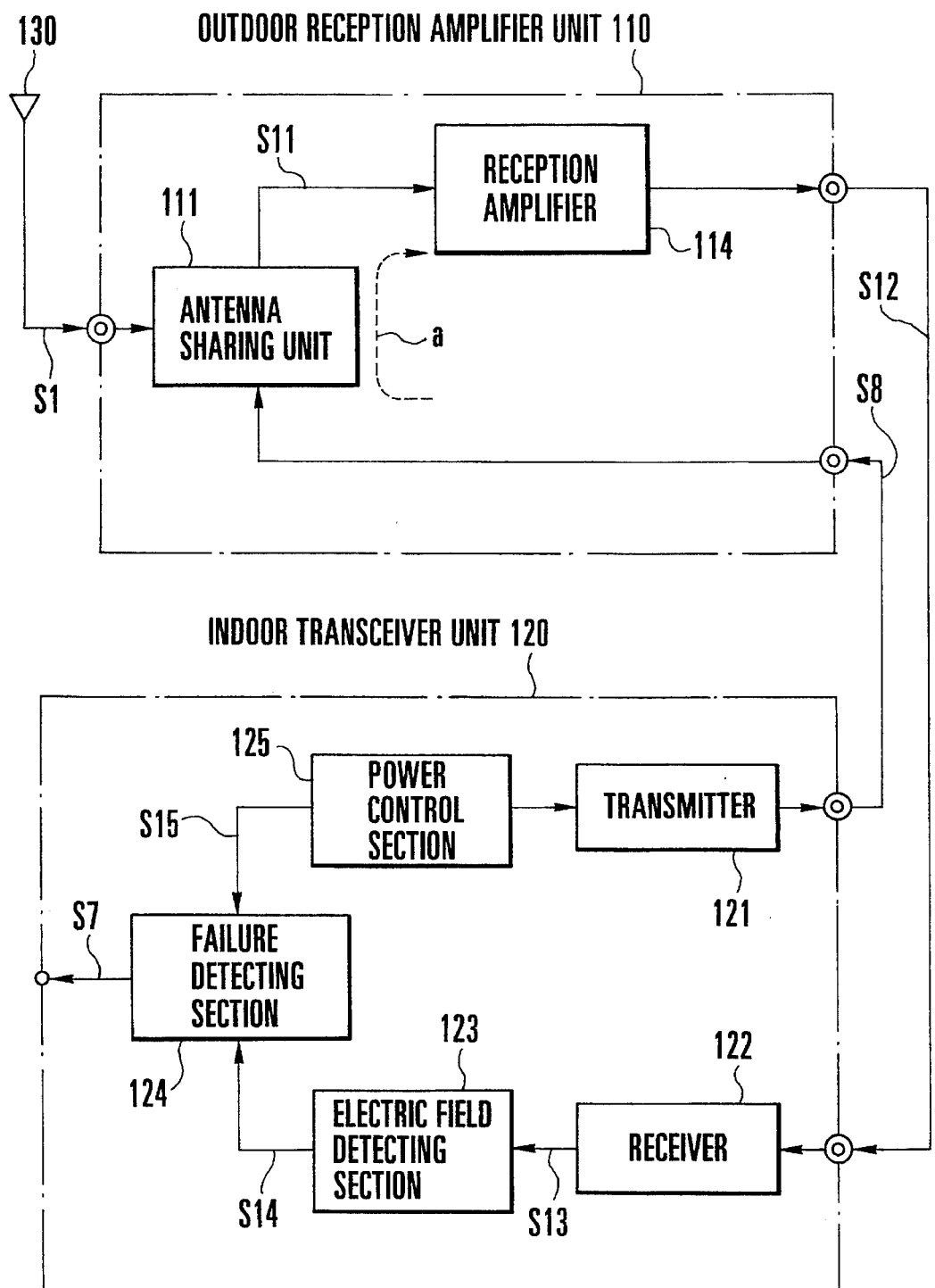
FIG. 1 is a block diagram showing a reception amplifier failure detecting device for a radio transceiver apparatus according to an embodiment of the present invention.

FIG. 1 shows a reception amplifier failure detecting device according to an embodiment of the present invention.

Referring to FIG. 1, an outdoor reception amplifier unit 110 includes an antenna sharing unit 111 and a reception amplifier 114. The antenna sharing unit 111 is installed outdoors together with an antenna 130 and is constituted by a hybrid circuit for demultiplexing a transmission signal S8 transmitted from a transmitter 121 constituting an indoor transceiver unit 120 to a path connected to the antenna 130, and also demultiplexing a reception signal S1 received by the antenna 130 to a path connected to a reception amplifier 114 on the reception circuit side. The reception amplifier 114 amplifies the reception signal S1 and outputs the amplified signal to a receiver 122 of the indoor transceiver unit 120 and to another receiver (not shown). Note that since the antenna sharing unit 111 cannot completely demultiplex the transmission signal S8 and the reception signal S1, leakage of a signal indicated by an arrow a is allowed within a range in which actual communication is not affected. The indoor transceiver unit 120 includes the receiver 122, an electric field detecting section 123, a power control section 125, and a failure detecting section 124. The receiver 122 receives an output signal S12 from the reception amplifier 114. The electric field detecting section 123 detects the electric field strength of reception signal information S13 received by the receiver 122, and outputs electric field strength information S14. The power control section 125 controls the transmission power of the transmitter 121 and outputs transmission power information S15. The failure detecting section 124 generates a failure detection reference value on the basis of the standard attenuation value of the antenna sharing unit 111, set when a transmission signal from the transmitter 121 leaks to the reception circuit side in the antenna sharing unit 111, the standard amplification value of the reception amplifier 114, and the transmission power information S15 output from the power control section 125. The failure detecting section 124 then compares the reference value with the electric field strength information S14 input from the electric field detecting section 123 to determine whether the reception amplifier 114 is operating normally, and outputs failure information S7 upon determining abnormality. It is known that a comparison oscillator is used as the electric field detecting section 123, as described in "Mobile Radio Communication Scheme", Kagakushimbun-sha, published on May 1979, p. 202.

The operation of the embodiment will be described next. A transmission signal leaking to the reception circuit side in the antenna sharing unit 111 is used as a target value to be always monitored to check whether the reception amplifier 114 is operating normally. The antenna sharing unit 111 cannot completely demultiplex the transmission signal S8 and the reception signal S1 owing to the circuit arrangement of the unit. For this reason, leakage of the signal indicated by the arrow a is allowed within the range in which actual communication is not affected. Therefore, the transmission signal S8 from the transmitter 121 is supplied to the antenna 130 by the antenna sharing unit 111, and at the same time, a signal of a predetermined level based on the specification of the antenna sharing unit 111 leaks to the reception amplifier 114. A signal S11 obtained by mixing the reception signal S1 and the leakage signal is amplified by the reception amplifier 114, and the amplified signal S12 is supplied to the indoor transceiver unit 120. The reception signal S1 used for normal communication is tuned to a reception signal frequency and received by a receiver (not shown) of the indoor transceiver unit 120. The receiver 122 receives the leakage transmission signal S8 tuned to the frequency of the transmission signal S8 and contained in the signal S12. The electric field strength of the reception signal information S13 received by the receiver 122 is detected by the electric field detecting section 123, and the detected information is supplied, as the electric field strength information S14, to the failure detecting section 124. The power control section 125 always monitors the transmission power output from the transmitter 121. When the output power varies from the standard transmission value, the power control section 125 performs control to restore the output power to the standard transmission value, and supplies the transmission power information S15 output from the transmitter 121 to the failure detecting section 124. The failure detecting section 124 forms a reference value for the electric field strength of a leakage transmission signal which can be received by the receiver 122 in a normal operation on the basis of the standard attenuation value of the transmission signal S8 leaking to the reception amplifier side in the antenna sharing unit 111, the standard amplification value of the reception amplifier 114, the transmission power information S15 about the transmitter 121 which is input from the power control section 125, according to "transmitter output of transmission signal"–"standard attenuation value of transmission signal leaking to reception circuit side in antenna sharing unit"+ "standard amplification value of reception amplifier". The failure detecting section 124 then compares the reference value with the actual electric field strength information S14 supplied from the electric field detecting section 123. If there is a difference of a predetermined value or more, the failure detecting section 124 determines that a failure has occurred in the reception amplifier 114, and outputs the failure information S7.

Assume that the transmitter output is 30 dBm; the standard attenuation value of the antenna sharing unit, 100 dB; and the standard amplification value of the reception amplifier, 30 dB. In this case, the following value is the reference value of the electric field strength of a leakage transmission signal received by the receiver 122 in a normal operation:

$$30-100+30=-40 \text{ (dBm)}$$

If, therefore, a failure is determined when the amplification function of the reception amplifier varies by ±2 dB or more, a failure is determined when the electric field strength of a signal received by the receiver 122 is lower than −42 dBm, or higher than −38 dBm.

The failure detecting section 124 will be described next with reference to FIG. 2.

Figure 2:
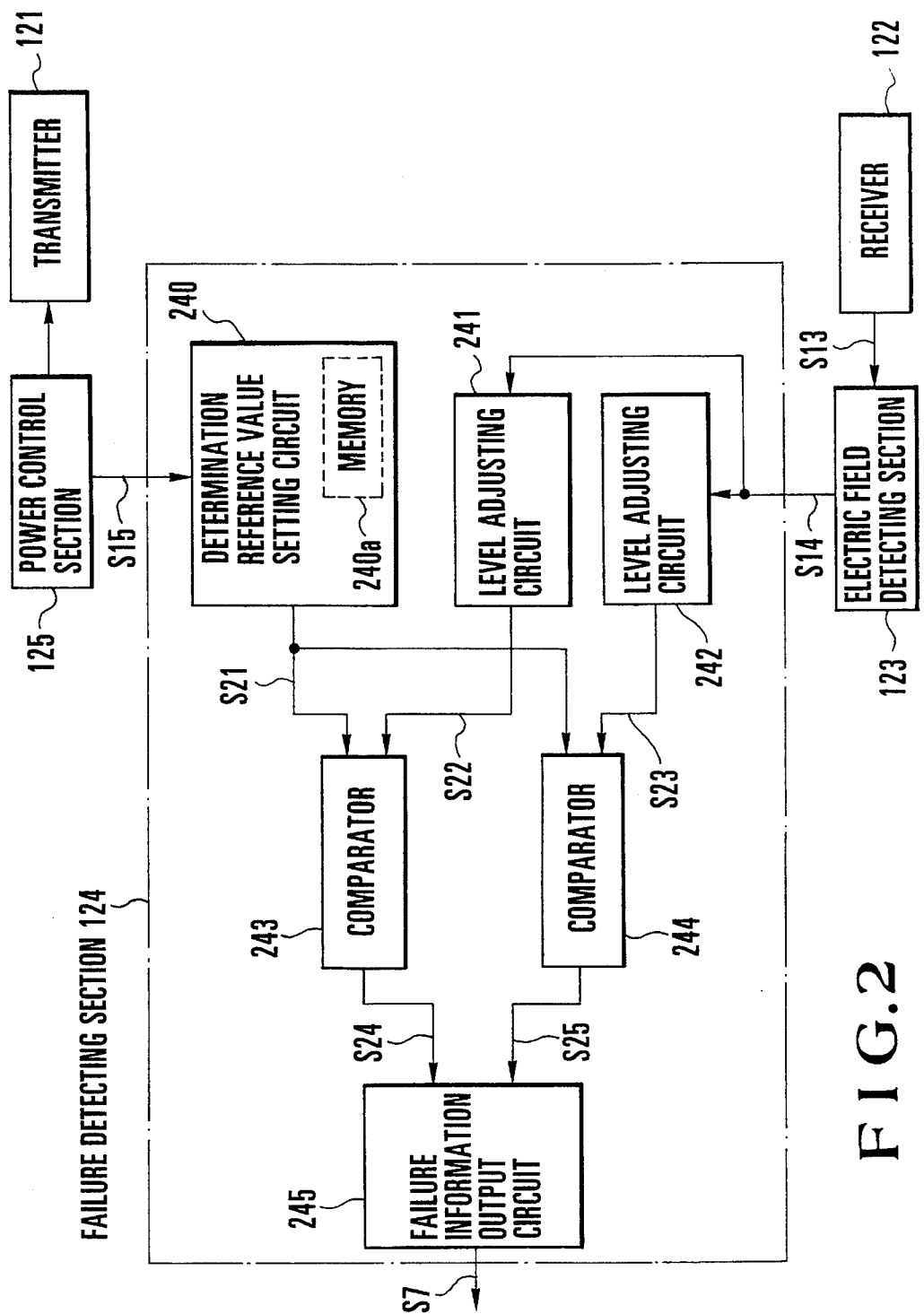
FIG. 2 is a block diagram showing a failure detecting section in FIG. 1.
Figure 3:
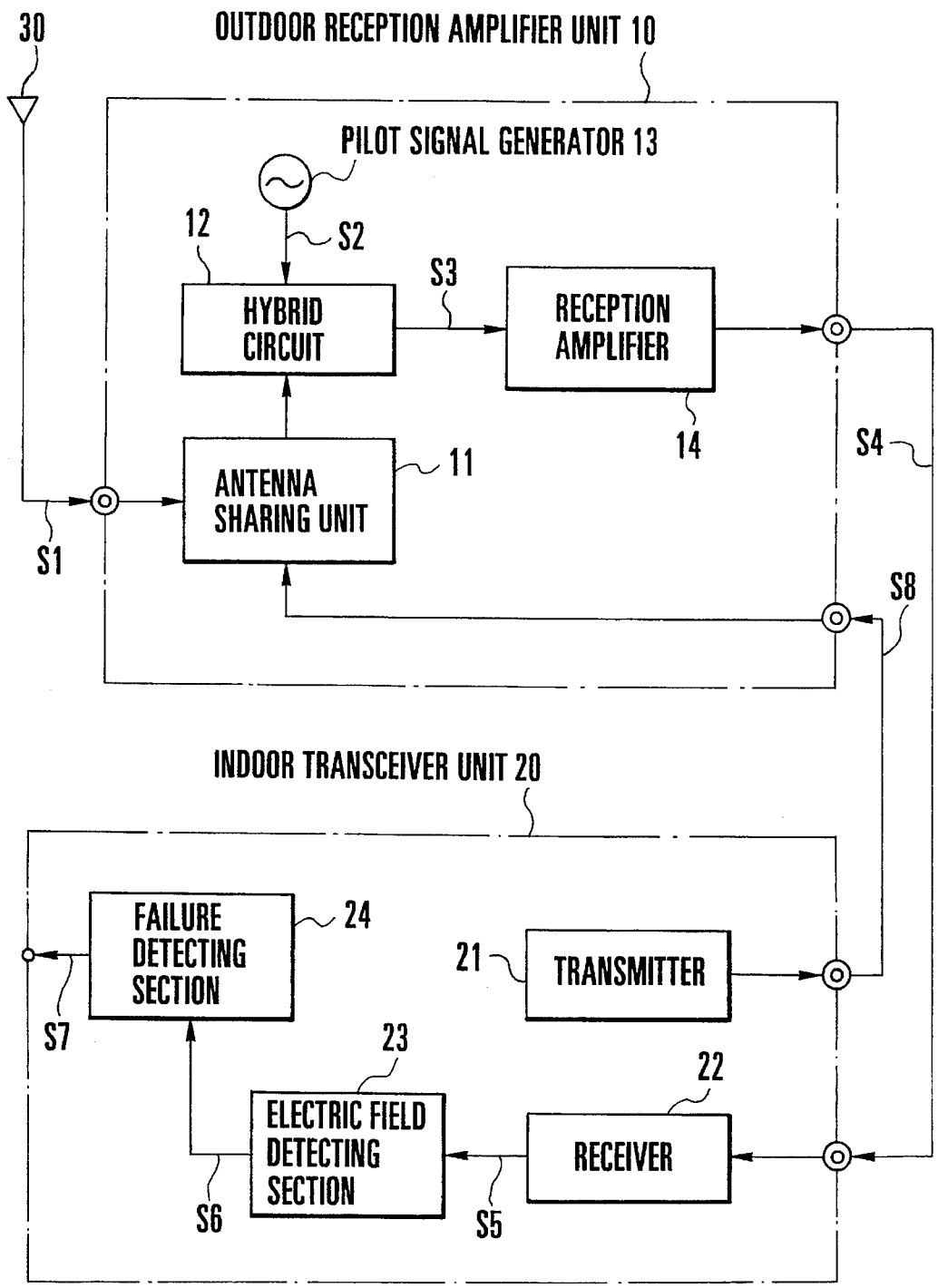
FIG. 3 is a block diagram showing a conventional failure detecting device.

FIG. 2 shows an embodiment of a failure detecting section of the present invention.

Referring to FIG. 2, a determination reference value setting circuit 240 presets the attenuation standard value of a transmission signal leaking in the antenna sharing unit 111 and the standard amplification value of the reception amplifier 114 in a memory 240a, and generates failure determination reference information S21 by subtracting the standard attenuation value of the antenna sharing unit 111 from the transmission power information S15 input from the power control section 125 and adding the standard amplification value of the reception amplifier 114 to the transmission power information S15. Level adjusting circuits 241 and 242 set allowable values in failure determination. The level adjusting circuit 241 supplies electric field strength information S22, obtained by decreasing the level of the electric field strength information S14 by the allowable value, to a comparator 243 (to be described later). The level adjusting circuit 242 supplies electric field strength information S23, obtained by increasing the level of the electric field strength information S14 by the allowable value, to a comparator 244. The comparators 243 and 244 serve to determine a failure. The failure determination reference information S21 formed by the determination reference value setting circuit 240 is input to both the comparators 243 and 244. Upon reception of a signal having a higher level than the failure determination reference information S21, the comparator 243 outputs information S24. Upon reception of a signal having a lower level than the failure determination reference information S21, the comparator 244 outputs information S25. That is, the comparator 243 performs failure determination when the level of the amplification function of the reception amplifier 114 exceeds the failure determination allowable value, whereas the comparator 244 performs failure determined when the level of the amplification function of the reception amplifier 114 is lower than the failure determination allowable value. An failure information output circuit 245 outputs the failure information S7 upon reception of the output information S24 or S25 from the comparator 243 or 244. The failure information S7 may be formed by calculating the logical OR of outputs from the comparators 243 and 244 to be output as information notifying only a failure in the reception amplifier 114. Alternatively, outputs from the comparators 243 and 244 may be considered as outputs representing failures caused by over- and under-amplification in the reception amplifier 114, respectively, so as to be output as different pieces of information with identification information being added to each information.

As has been described above, according to the present invention, in detecting a failure, a transmission signal having a predetermined standard value and leaking to the reception circuit side in the antenna sharing unit is used for failure detection. For this reason, no special pilot signal generator needs to be added to the outdoor reception amplifier unit. Therefore, the outdoor reception amplifier unit can be formed at low cost, and the cost for periodic maintenance can be greatly reduced.

In addition, transmission power information from the power control section for controlling the output power of the transmitter is used as part of failure determination information. Therefore, the failure determination reference can be changed with variations in the output of the transmitter. This allows accurate failure detection.

What is claimed is:

1. A reception amplifier failure detecting device for a radio transceiver apparatus, comprising:

demultiplexing means for demultiplexing a transmission signal from a transmission system to an antenna, and also demultiplexing a reception signal from the antenna to a reception system;

reception amplification means, connected to an input stage of said reception system, for amplifying the reception signal demultiplexed by said demultiplexing means;

reception means for receiving an output signal from said reception amplification means;

electric field detecting means for detecting an electric field strength of a signal received by said reception means;

transmission means, constituting said transmission system, for outputting a transmission signal to said antenna via said demultiplexing means;

power control means for controlling transmission power of said transmission means on the basis of a standard transmission value, and outputting transmission power information; and failure detecting means for performing failure determination by comparing electric field strength information from said electric field detecting means with a failure detection reference value set on the basis of a standard attenuation value set when a transmission signal from said transmission means leaks to said reception system in the demultiplexing means, a standard amplification value of said reception amplification means, and the transmission power information of said transmission means.

2. A device according to claim 1, wherein said demultiplexing means and said reception amplification means constitute an outdoor reception amplifier unit, and said reception means, said electric field detecting means, said transmission means, said power control means, and said failure detecting means constitute an indoor transceiver unit.

3. A device according to claim 1, wherein said failure detecting means comprises reference value setting means for setting a reference value for failure detection by using the standard attenuation value set when the transmission signal from said transmission means leaks to said reception system in the demultiplexing means, the standard amplification value of said reception amplification means, and the transmission power information of said transmission means, determination means for checking whether an absolute value of a difference between the reference value set by said reference value setting means and the electric field strength information from said electric field detecting means is not less than a predetermined value, and failure information output means for outputting failure information on the basis of an output from said determination means.

4. A device according to claim 3, wherein said determination means comprises electric field strength information adjusting means for increasing/decreasing the electric field strength information from said electric field detecting means by a predetermined value, first comparison means for performing an output operation when a level of the electric field strength information increased by said electric field strength information adjusting means is lower than the reference value set by said reference value setting means, and second comparison means for performing an output operation when a level of the electric field strength information decreased by said electric field strength information adjusting means exceeds the reference value set by said reference value setting means, and said failure information output means outputs failure information on the basis of outputs from said first and second comparison means.

5. A device according to claim 4, wherein said failure information output means outputs a logical OR between outputs from said first and second comparison means.

6. A device according to claim 4, wherein identification information is added to failure information from said failure information output means to indicate that the information is based on an output from a specific one of said first and second comparison means.

7. A device according to claim 3, further comprising a memory for storing the standard attenuation value set when the transmission signal from said transmission means leaks to said reception system in the demultiplexing means, and the standard amplification value of said reception amplification means.

8. A reception amplifier failure detecting device for a radio transceiver apparatus, comprising:

an outdoor reception amplifier unit including demultiplexing means for demultiplexing a transmission signal from a transmission system to an antenna, and also demultiplexing a reception signal from the antenna to a reception system, and reception amplification means, connected to an input stage of said reception system, for amplifying the reception signal demultiplexed by said demultiplexing means; and an indoor transceiver unit including reception means for receiving an output signal from said reception amplification means, electric field detecting means for detecting an electric field strength of a signal received by said reception means, transmission means, constituting said transmission system, for outputting a transmission signal to said antenna via said demultiplexing means, power control means for controlling transmission power of said transmission means and outputting transmission power information, reference value setting means for setting a reference value for failure detection by using a standard attenuation value set when a transmission signal from said transmission means leaks to said reception system in the demultiplexing means, a standard amplification value of said reception amplification means, and the transmission power information of said transmission means, determination means for checking whether an absolute value of a difference between the reference value set by said reference value setting means and the electric field strength information from said electric field detecting means is not less than a predetermined value, and failure information output means for outputting failure information on the basis of an output from said determination means.

9. A reception amplifier failure detecting method for a radio transceiver apparatus, comprising the steps of:

outputting a transmission signal from transmission means to an antenna via demultiplexing means for demultiplexing a transmission signal from a transmission system to said antenna, and also demultiplexing a reception signal from said antenna to a reception system;

controlling transmission power of said transmission means on the basis of a standard transmission value;

outputting transmission power information of said transmission means;

setting a reference value for failure detection by using a standard attenuation value set when a transmission signal from said transmission means leaks to said reception system in the demultiplexing means, a standard amplification value of said reception amplification means, and the transmission power information of said transmission means, causing reception amplification means to amplify the reception signal received via said demultiplexing means;

detecting an electric field strength of the reception signal from said reception amplification means;

determining whether an absolute value of a difference between the set reference value for failure detection and the detected electric field strength is not less than a predetermined value; and outputting failure information on the basis of the determination result.

\* \* \* \* \*